United States Patent
Holm et al.

(10) Patent No.: US 6,540,152 B2
(45) Date of Patent: *Apr. 1, 2003

(54) DISPENSING ASSEMBLY

(75) Inventors: William Holm, Stockholm (SE); Johan Kronstedt, Sollentuna (SE); Hakan Sandell, Taby (SE)

(73) Assignee: Mydata Automation AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/971,023

(22) Filed: Oct. 5, 2001

(65) Prior Publication Data

US 2002/0043570 A1 Apr. 18, 2002

Related U.S. Application Data

(63) Continuation of application No. PCT/SE00/00673, filed on Apr. 7, 2000.

(30) Foreign Application Priority Data

Apr. 8, 1999 (SE) .............................................. 9901253

(51) Int. Cl.⁷ .............................................. B05B 17/00
(52) U.S. Cl. .............................. 239/1; 239/67; 239/71; 239/373; 239/390; 239/750; 118/300; 118/323
(58) Field of Search ................................ 239/1, 67, 71, 239/73, 328, 333, 373, 589, 390, 750; 118/300, 303, 308, 323

(56) References Cited

U.S. PATENT DOCUMENTS

| 5,042,688 | A | * | 8/1991 | Srivastava et al. | 118/300 |
| 5,505,777 | A | * | 4/1996 | Ciardella et al. | 118/323 |
| 6,082,289 | A | * | 7/2000 | Cavallaro | 118/300 |
| 6,387,184 | B1 | * | 5/2002 | Gibson et al. | 239/390 |

FOREIGN PATENT DOCUMENTS

| JP | 10-294557 | 11/1998 |
| JP | 10-341074 | 12/1998 |
| SE | 461 822 | 3/1990 |
| SE | 513 527 | 9/2000 |
| WO | 90/00852 | 1/1990 |

* cited by examiner

*Primary Examiner*—Steven J. Ganey
(74) *Attorney, Agent, or Firm*—Birch, Stewart, Kolasch & Birch, LLP

(57) ABSTRACT

An assembly for dispensing droplets of a viscous medium. The assembly is releasably mountable in a machine using the assembly for providing a substrate with deposits. The assembly comprises an assembly holder having first holding portions mating with an assembly support of a docking device of the machine, a nozzle, an eject mechanism connected to the nozzle, a viscous medium container connected to the eject mechanism, an assembly property element holding information about properties of the assembly, and signal interface. Thus, the assembly is to be regarded as a separate, exchangeable unit.

40 Claims, 8 Drawing Sheets

DISPENSING ASSEMBLY

This application is a Continuation of copending PCT International Application No. PCT/SE00/00673 filed on Apr. 7, 2000, which was published in English and which designated the United States and on which priority is claimed under 35 U.S.C. §120, the entire contents of which are hereby incorporated by reference.

CROSS-REFERENCES TO RELATED APPLICATIONS

This application is a Continuation of PCT/SE00/00673, filed Apr. 7, 2000, the entirety of which is hereby incorporated by reference.

BACKGROUND OF THE INVENTION

1. Field of the Invention

This invention generally relates to the field of providing substrates with deposits, which in a subsequent step are used for receiving components on the substrate. More particularly, this invention relates to an assembly for dispensing droplets of a viscous medium and a machine for providing a substrate with deposits by means of such an assembly, wherein the deposits are formed by the droplets.

2. Description of the Background Art

A prior art dispensing machine is disclosed in copending patent application U.S. 09/719 237. More particularly, this prior art machine is of a non-contact dispensing, or jetting, type. Said patent application is focused on a certain part of the machine, which part is a new device for dispensing droplets. The device comprises an eject chamber (37; 137) for containing a small volume of the viscous medium prior to the ejection thereof, an eject nozzle (36; 136) communicating with the eject chamber, eject means (22, 25; 122, 135) for rapidly ejecting said medium from the eject chamber through said nozzle, and supply means for feeding said medium into the eject chamber. The supply means comprises a rotatably driven feed screw receiving the medium from a syringe containing the medium and forcing the medium towards the eject chamber. The medium contained within the syringe in turn is pressurised in order to force it out of the outlet of the syringe.

This prior art device works well. However, there is a problem involved in exchanging syringes in the device, particularly when the new syringe contains a different type of medium than the one to be exchanged. In the last mentioned case the operator of the machine has to rinse the portions of the device containing the medium. These portions are, inter alia, the eject chamber, the eject nozzle, and the feed screw. In the case of a non-contact dispensing machine, the rinse of the nozzle and the associated ejection parts is particularly important in order to achieve a good operation. When handling several syringes with different types of medium, it could happen that the operator exchanges a syringe for syringe not containing the proper medium. This causes additional rinsing and substrates may have to be rejected. While the rinse operation is performed the machine is stopped.

Another problem arising when exchanging syringes is that before resuming the production several dispensing operations must be performed, in order to refill the nozzle and the associated ejection parts with the new medium. Some extra ejections should be performed in order to guarantee that the medium is free from air bubbles. An attempt to reduce the exchange time is disclosed in JP-10294557. The time reduction is obtained by arranging a separate syringe holder at the machine. At the holder, a syringe which later on is to be substituted for the one presently used, is pressurised in that an amount of the medium is dispensed into a container. Thereby it is secured that the medium at the outlet of the syringe is free from air bubbles. Consequently, when replacing the syringe presently at use with the new one the application of medium onto a circuit board can be resumed immediately. However, this prior art solution is only useful in machines using the syringe for direct dispensing, and does not improve a machine of the jetting type to the same extent. Since such a machine has a separate ejecting mechanism, which receives the medium from the syringe, this ejecting mechanism still has to be refilled with the new medium before the application operation is resumed.

Additionally, using a new syringe requires input of associated data to the machine. This data input is time consuming and involves a risk for inputting erroneous data.

Consequently, the exchange of syringes causes an undesired fall in production. Additionally, the waste medium is generally environmentally hazardous and has to be carefully taken care of.

SUMMARY OF THE INVENTION

The object of this invention is to provide a solution to the above-mentioned problems occurring when changing syringes.

The invention, in one aspect thereof, provides for an assembly for dispensing droplets of a viscous medium, said assembly being releasably mountable in a machine using the assembly for providing a substrate with deposits, and comprising a nozzle, an eject mechanism connected with the nozzle, a viscous medium container connected with the eject mechanism, an assembly property means holding information about properties of the assembly, and signal interface means.

By being releasably mountable the assembly is usable as a separate unit easily exchangeable and containing the medium. Consequently, the operator is relieved from the problem of handling the syringes and rinsing parts of the assembly. Additionally, the problem of handling the waste medium is eliminated. The assembly provides for a recycling system where the whole assembly, when empty of medium, is sent back to the supplier who originally delivered it.

Further, the assembly comprises an assembly property means, which holds information regarding the assembly, such as identity, type and other properties of the viscous medium contained in the container, or the date when it was filled. Consequently, it can be made sure that an assembly containing the proper viscous medium is mounted in the machine. Thereby operator mistakes resulting in improper medium being provided on a substrate can be avoided. Additionally, the down time of the machine is decreased. Further, the information held in the property means can be directly transferred to the machine through the signal interface means, thereby eliminating the above mentioned risk for (manual) erroneous input.

For the purposes of this application, it is to be noted that the term "deposits" should be interpreted as single or groups of viscous medium dots deposited on the substrate; the term "viscous medium" should be interpreted as solder paste, flux, adhesive, conductive adhesive or any other kind of medium used for fastening components on the substrate; and that the term "substrate" should be interpreted as a printed circuit board (PCB), a substrate for ball grid arrays (BGA), chip scale packages (CSP), quad flat packages (QFP), and flip-chips or the like.

In another aspect thereof the invention provides for a machine for providing a substrate with deposits by dispensing droplets of a viscous medium onto the substrate, comprising a docking device for receiving an assembly of the above described type, said docking device comprising an assembly support and complementary signal interface means.

In a further aspect thereof the invention provides for a docking device for receiving an assembly of the above described type, said docking device comprising an assembly support and complementary signal interface means.

The docking device facilitates the mounting/dismounting of the assembly at the machine by providing specific means, such as the assembly support and the interface means, simplifying the docking of the assembly. The mounting/dismounting is further facilitated by the assembly support comprising pneumatically operable assembly locking means, enabling a fast mounting/dismounting.

In accordance with another embodiment of the invention, there is provided an exchange assembly support for supporting at least one exchange assembly. By means of this support the invention is additionally improved by providing for an automatic exchange of assemblies at the docking device. Further, change over times are reduced due to the possibility of, while the machine is running, providing the exchange assembly support with new full assemblies, assemblies holding different types of viscous medium, assemblies having different types of nozzles, etc., to be used later on by the machine.

Preferably, said exchange assembly support also comprises complementary signal interface means. Through these signal interface means it is possible to communicate the properties of the assemblies supported in the exchange assembly support to the machine. Thereby, further, operator mistakes can be avoided since each exchange assembly may be placed in an arbitrary position in the exchange assembly support and the machine will still recognise the proper exchange assembly. It is also possible to alert the operator when there is no adequate assembly for current or pending jobs in the assembly support. This gives the advantage of the operator being able to supply new assemblies in time and further machine stoppages are avoided.

In yet another aspect thereof, the invention provides for a method of exchanging an assembly for dispensing droplets of a viscous medium, said assembly being releasably mounted in a machine using the assembly for providing a substrate with deposits, wherein the assembly comprises an assembly holder having first holding means mating with an assembly support of a docking device of the machine, and an assembly property means holding information about properties of the assembly, comprising the steps of:

selecting an exchange assembly;
exchanging the assembly for the exchange assembly; and
transferring property information from the exchange assembly to the machine.

This method, which is possible to perform by means of inventive constructions according to the invention, that is the separate dispensing assembly releasably mountable in a dispensing machine arranged for receiving such an assembly, is advantageous in that the operator of the machine can be relieved of the stressful exchanges of syringes while the machine has to be down. The transfer of property information assures that the correct assembly is mounted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Exemplifying embodiments of the invention will be described below with reference to the accompanying drawings, in which.

DETAILED DESCRIPTION OF THE PREFERRED EMBODIMENTS

Figure 1:
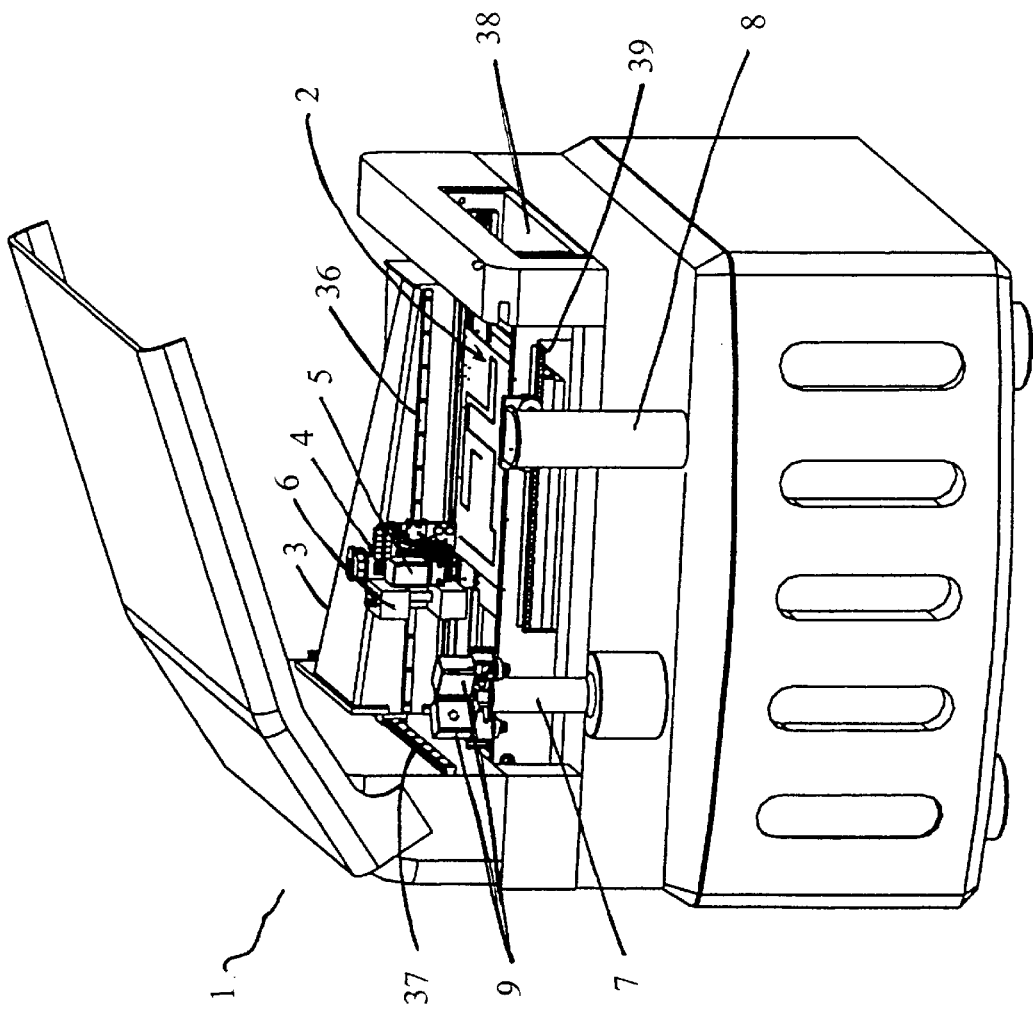
FIG. 1 is a schematic perspective view of an embodiment of the machine according to the present invention.

FIG. 1 illustrates a presently preferred embodiment of a machine 1 for providing a substrate 2 with deposits by dispensing droplets of a viscous medium onto the substrate 2, in accordance with the present invention. Let us for simplicity assume that the viscous medium is solder paste, which is one alternative as defined above. In this embodiment the machine 1 is of a type comprising an X-beam 3 and an X-wagon 4 connected with the X-beam 3 via an X-rail 36 and reciprocatingly movable along the X-rail 36. The X-beam, in turn, is reciprocatingly movably connected with a Y-rail 37, thereby being movable perpendicularly to the X-rail 36. The Y-rail 37 is rigidly mounted in the machine 1. Generally, the movements are driven by linear motors (not shown).

Further, the machine 1 comprises a conveyor 38 for carrying the substrate 2 through the machine 1, and a fixing device 39 for fixing the substrate 2 when dispensing is to take place.

Further, the machine 1 comprises a docking device 10 connected with the X-wagon 4 and an assembly 5 releasably mounted at the docking device 10. The assembly 5 is arranged for dispensing droplets of solder paste, which impact and form deposits on the substrate 2.

Further, the machine 1 comprises a calibration station 8, providing a calibration surface.

The machine 1 also comprises an exchange assembly support 7, supporting further assemblies 9, which may be substituted for the assembly 5 currently carried by the docking device 10.

Additionally, the machine 1 comprises a machine vision device 6, which in this embodiment is a camera. The camera 6 is used for determining the position and rotation of the substrate 2 and for checking the result of the dispensing process by viewing the deposits.

As understood by those skilled in the art, the machine also comprises a control unit (not explicitly shown) executing software for running the machine. This control unit also has access to an assembly database (not shown).

Briefly, the machine 1 works as follows. The substrate 2 is fed into the machine 1 by means of the conveyor 38, upon which the substrate 2 is put. When the substrate 2 is in proper position under the X-wagon 4 it is fixed with the aid of the fixing device 39. By means of the camera 6, fiducial markers, which are prearranged on the surface of the substrate 2 and which determine the precise position thereof, are located. Then, by moving the X-wagon 4 over the substrate 2 in a predetermined (preprogrammed) pattern and operating the assembly 5 at predetermined locations, solder paste is applied on the substrate 2 at the desired locations. Should the assembly 5 run out of solder paste or should a different medium be required at certain locations, etc., the machine 1 is programmed to automatically exchange the assembly 5 for one of the further assemblies, or exchange assemblies, 9 stored at the exchange assembly support 7 and to determine the new assembly's properties. Then the application process will continue.

Figure 3:
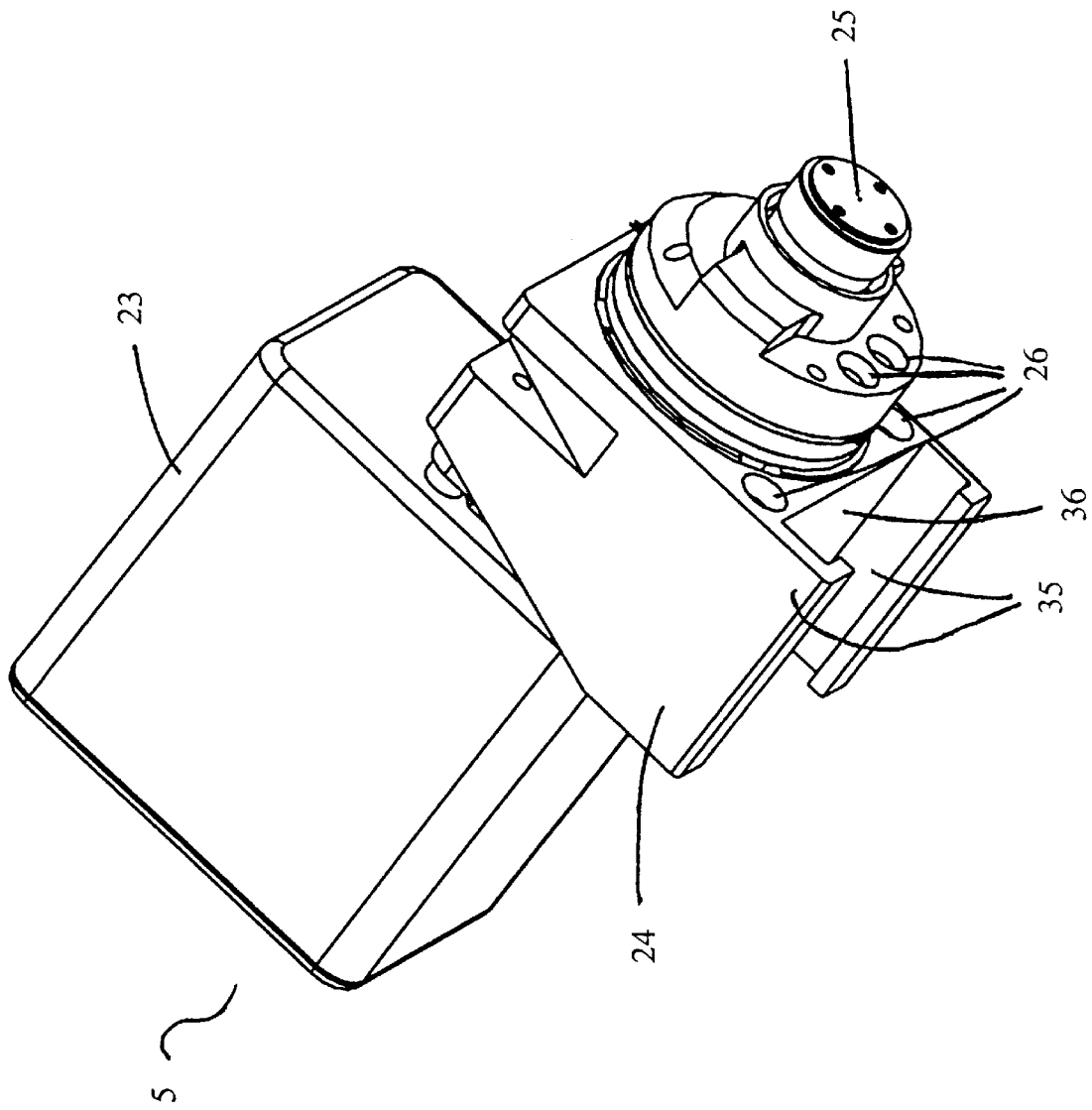
FIG. 3 is a schematic perspective view from below and from one side of the assembly shown in FIG. 2.
Figure 4:
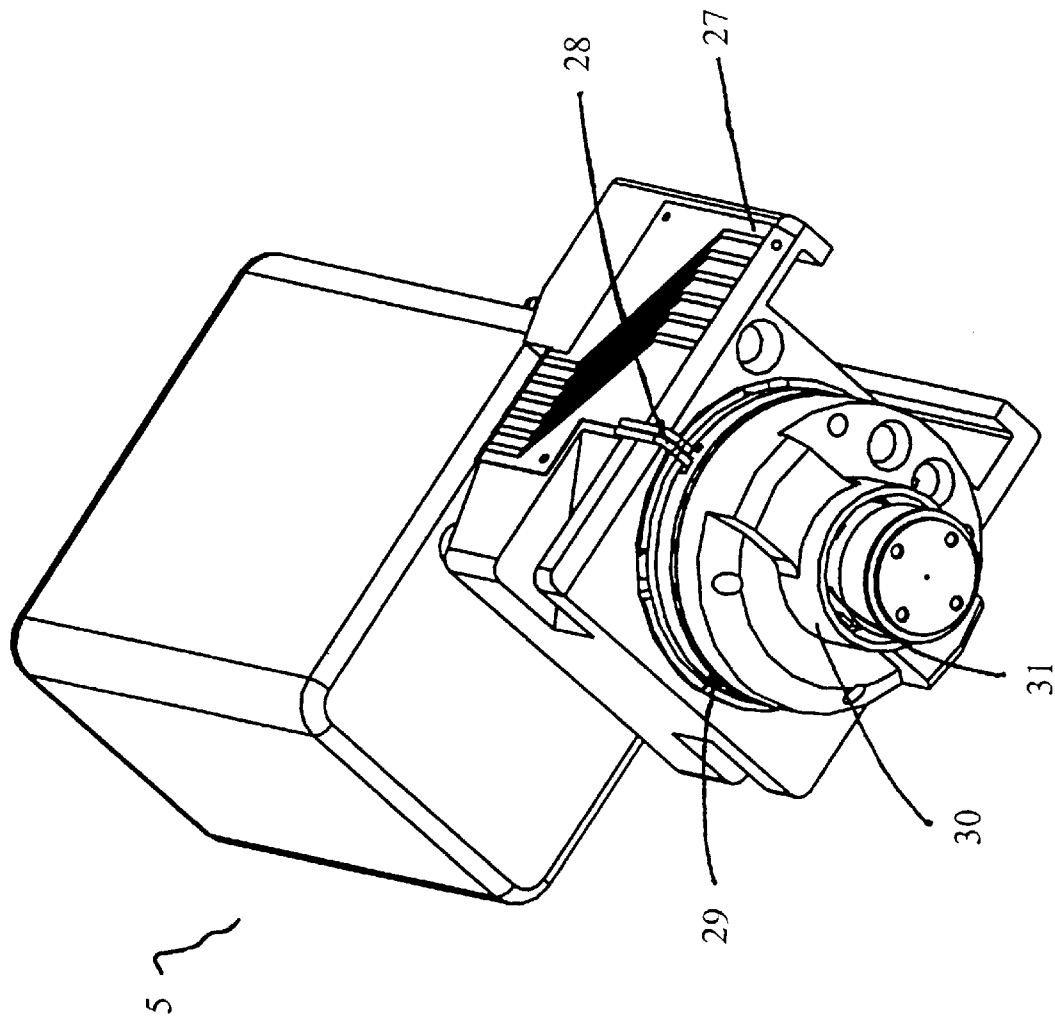
FIG. 4 is a schematic perspective view from below and from another side of the assembly shown in FIG. 2.
Figure 7A:
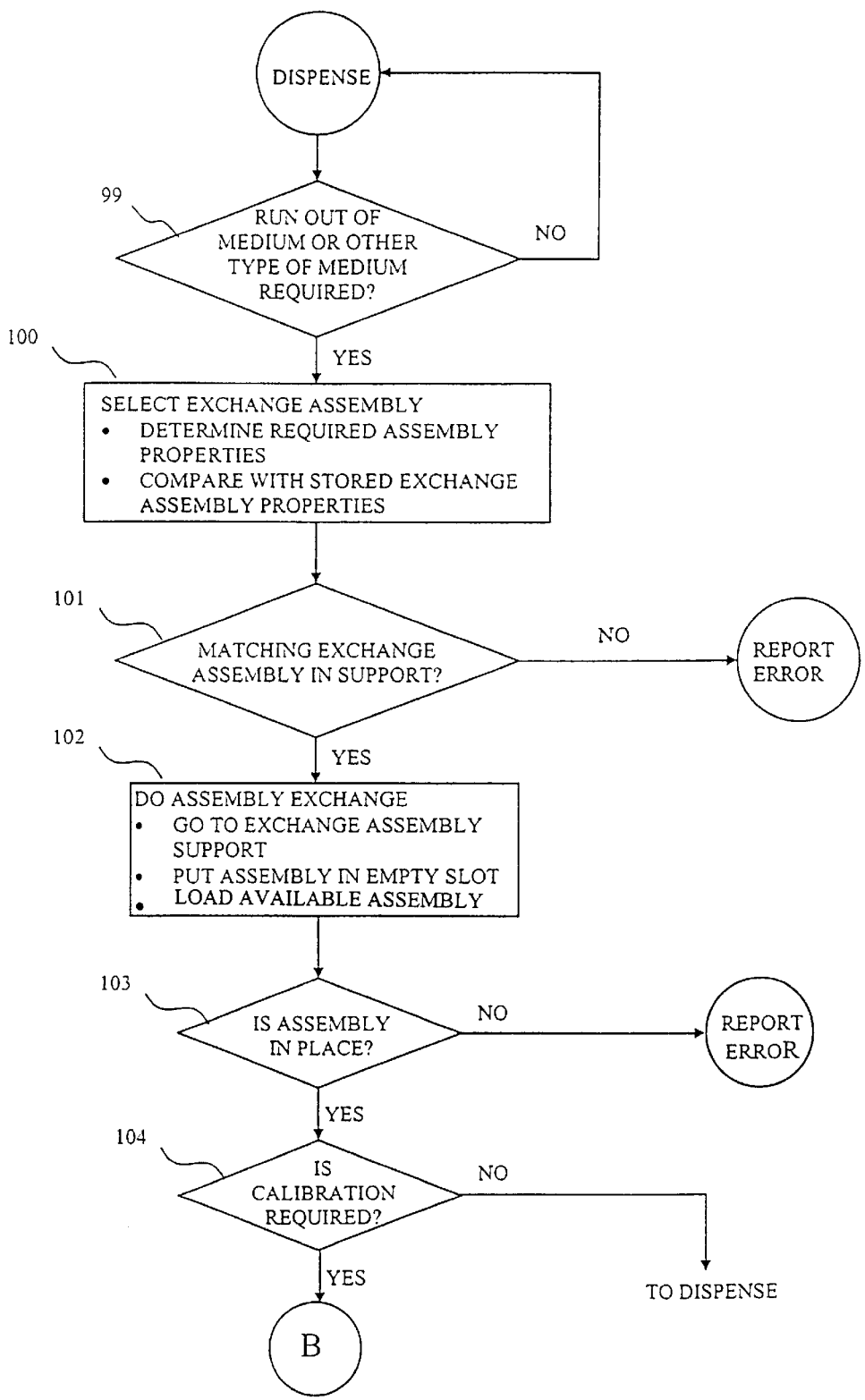
FIGS. 7a and 7b show two parts of a flowchart of an exchange and calibration procedure of the present invention.
Figure 7B:
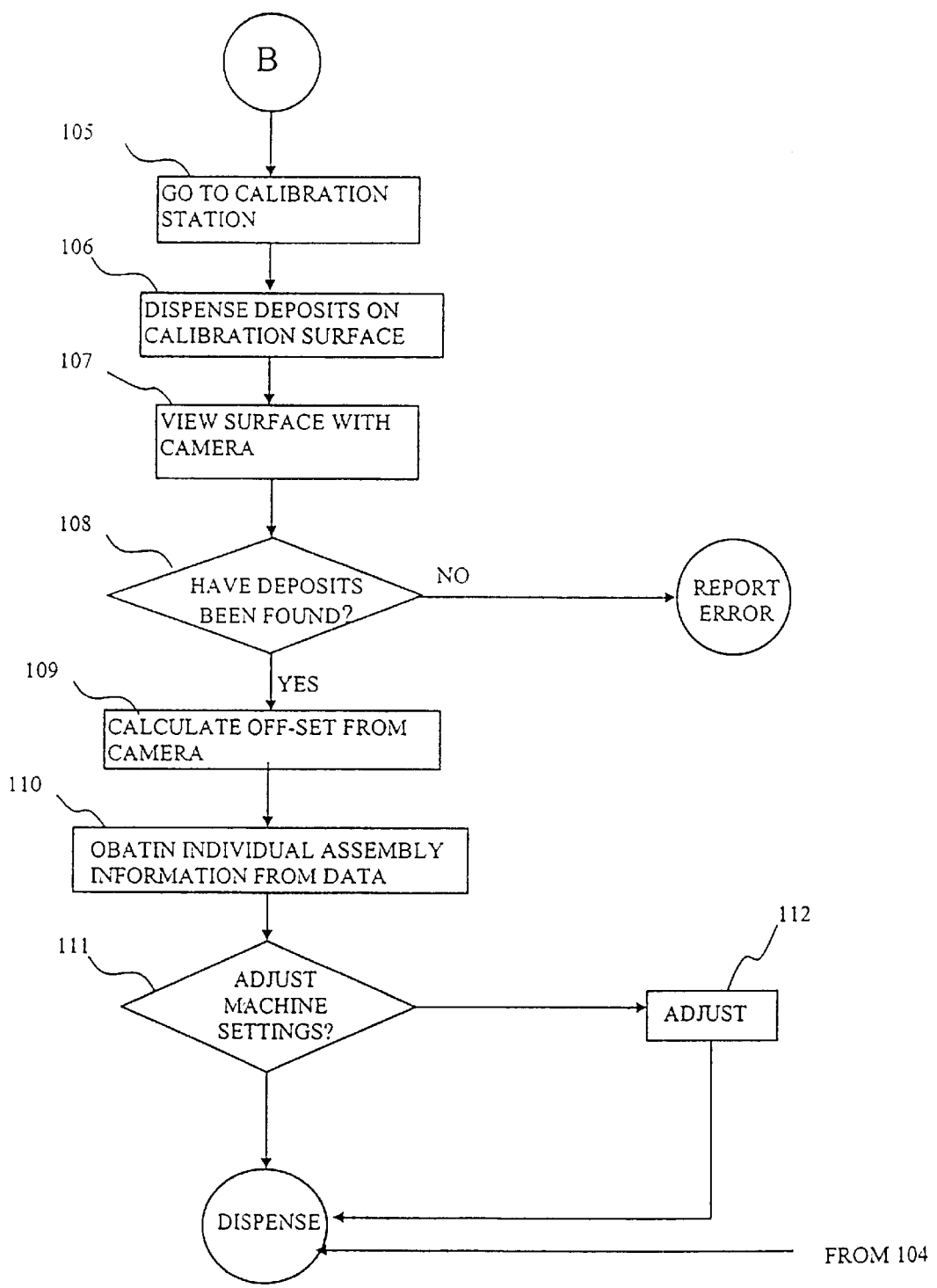

However, when acquiring a new assembly 9 from the exchange assembly support 7, the machine 1 will perform a calibration in order to ascertain that the dispensed droplets accurately will impact the substrate 2 at the predetermined locations. The calibration is preferred since the position of an eject nozzle 25 of the assembly 5, see FIG. 3, may differ slightly from one assembly to the other, and, since the alignment of the assembly 5 at the docking device 10 may differ slightly from one docking to the other. The exchange and calibration procedure will now be described in more detail with reference to the flow chart of FIG. 7.

While dispensing, or jetting as will be explained below, in step 99 it is determined whether an assembly exchange is required. This is done by checking whether the assembly 5 runs out of solder paste, whether another type of nozzle is required, and whether another type of medium is required. If an assembly exchange is required, the procedure is continued in step 100–101 by selecting an exchange assembly. This is done by determining specific properties of the required exchange assembly, checking the exchange assembly support 7 for an exchange assembly having said properties and by appointing an exchange assembly having said properties for the exchange. Said checking of the exchange assembly support preferably comprises retrieving data associated with the respective exchange assemblies from the data base, where data about the assemblies has been stored in advance, and evaluating which one of the exchange assemblies that matches the present requirements. If there is no exchange assembly having the required properties in the exchange assembly support 7 an error signal is generated and the machine is halted. Otherwise the procedure is continued in step 102 by performing an assembly exchange. This is done by moving the X-wagon to the exchange assembly support 7, releasing the assembly 5 from the docking device 10 and putting it at an available place of the exchange assembly support 7, and loading the appointed exchange assembly 9 into the docking device 10. Then, in step 103, it is checked that the new assembly is properly docked at the docking device 10 and that the docked assembly has the required properties. If not an error signal is generated and the machine 1 is halted, otherwise the procedure is continued in step 104 where it is determined whether the new assembly 9 needs to be calibrated. If a calibration is needed, the procedure is continued in step 105, otherwise it is finished and the dispensing is resumed.

In step 105, the X-wagon 4 is moved to the calibration station 8. Then, in step 106, a plurality of deposits is generated on the calibration surface, which in this embodiment is a plate. It is preferred to generate a straight line of deposits, though any appropriate pattern is employable. Then, in step 107, the line of deposits is viewed by the camera 6. If not all deposits are found, in next step 108, an error signal is generated and the machine is halted. Otherwise, the procedure is continued in step 109, where the position of the line of deposits is determined and compared to an expected position. The deviation, if any, is defined as a nozzle offset. As mentioned above, the nozzle 25 may not be positioned exactly at the same position as the nozzle 25 of the previously docked assembly 5. In order to ascertain a high accuracy of the point of impact of the droplets on the substrate a trigger window for the machine 1 is adjusted by means of the offset. Trigger window is understood by the those skilled in the art as a time window within which a droplet has to be jetted, while moving the X-wagon 4 over the substrate 2, in order to impact the substrate 2 at the desired location. Then in step 110 individual information regarding the exchange assembly is obtained from the database or directly from the exchange assembly. On the basis of this information, in step 111, it is determined if new machine settings are required. If yes, the procedure is continued in step 112, where the machine settings are adjusted and the dispensing is continued, otherwise the dispensing is directly continued.

In alternative, though less preferred, embodiments of the invention, the machine obtains data associated with an assembly directly from the assembly rather than from the database. In one example thereof, the machine appoints an arbitrary exchange assembly in the exchange assembly support 7 without knowing its properties for the exchange. The complete set of properties of the exchange assembly are though not established until it is checked that said exchange assembly 9 is properly docked at the docking device 10, and that the docked assembly 9 has the required identity in step 103. Should the docked assembly not have the required identity the machine appoints another exchange assembly in the exchange assembly support 7 for the exchange, and the assembly exchange procedure of step 102 is repeated.

In another embodiment of the invention, in step 103, it is merely checked whether the new assembly is properly docked at the docking device 10 and not whether the new assembly has the required identity. This can be omitted, since the identity of the exchange assembly already has been determined at the exchange assembly support 7.

Figure 2:
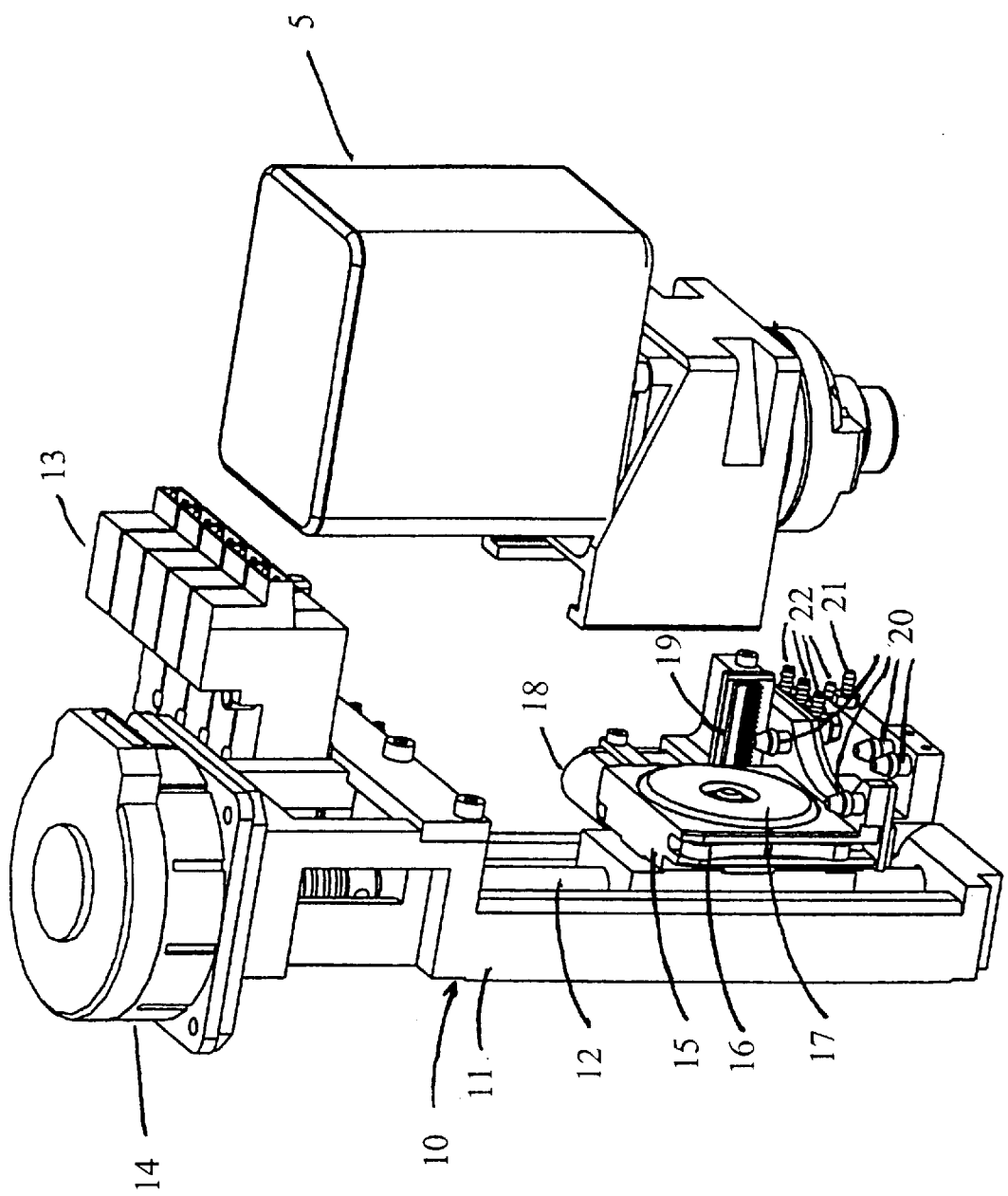
FIG. 2 is a schematic perspective view from above of an embodiment of the docking device and assembly of the present invention.

In FIG. 2 preferred embodiments of the docking device 10 and the assembly 5 are illustrated in greater detail. The assembly 5 is further illustrated in FIGS. 3–6. The docking device 10 comprises an assembly support 15 and a stand 11. The assembly support 15 is arranged at the stand 11 and is reciprocatingly movable along the length of the stand 11. Consequently, the direction of movement is in a Z-direction substantially perpendicular to the substrate 2. In other words, the assembly support 15 is movable towards and away from the surface of the substrate 2.

This motion is realised with the aid of a Z-motor 14 and a ball screw 12, appropriately interconnected. The motion along the stand 11 is used for docking the assembly 5 and for adjusting the height over the PCB when dispensing.

The assembly 5 comprises an assembly holder 24 having first holding means, in the form of two opposite L-shaped legs 35 and a wall 36 connecting them, wherein the legs 35 and wall 36 together defines a first slot. The first slot mates to the assembly support 15 of the docking device 10. When docked, the assembly 5 is accurately positioned and retained by means of an assembly alignment means, constituted by a spring 16, exerting a force on one of the legs 35, and a pneumatically operable assembly locking means, here constituted by a locking piston 17 exerting a force on the wall 36.

Figure 6:
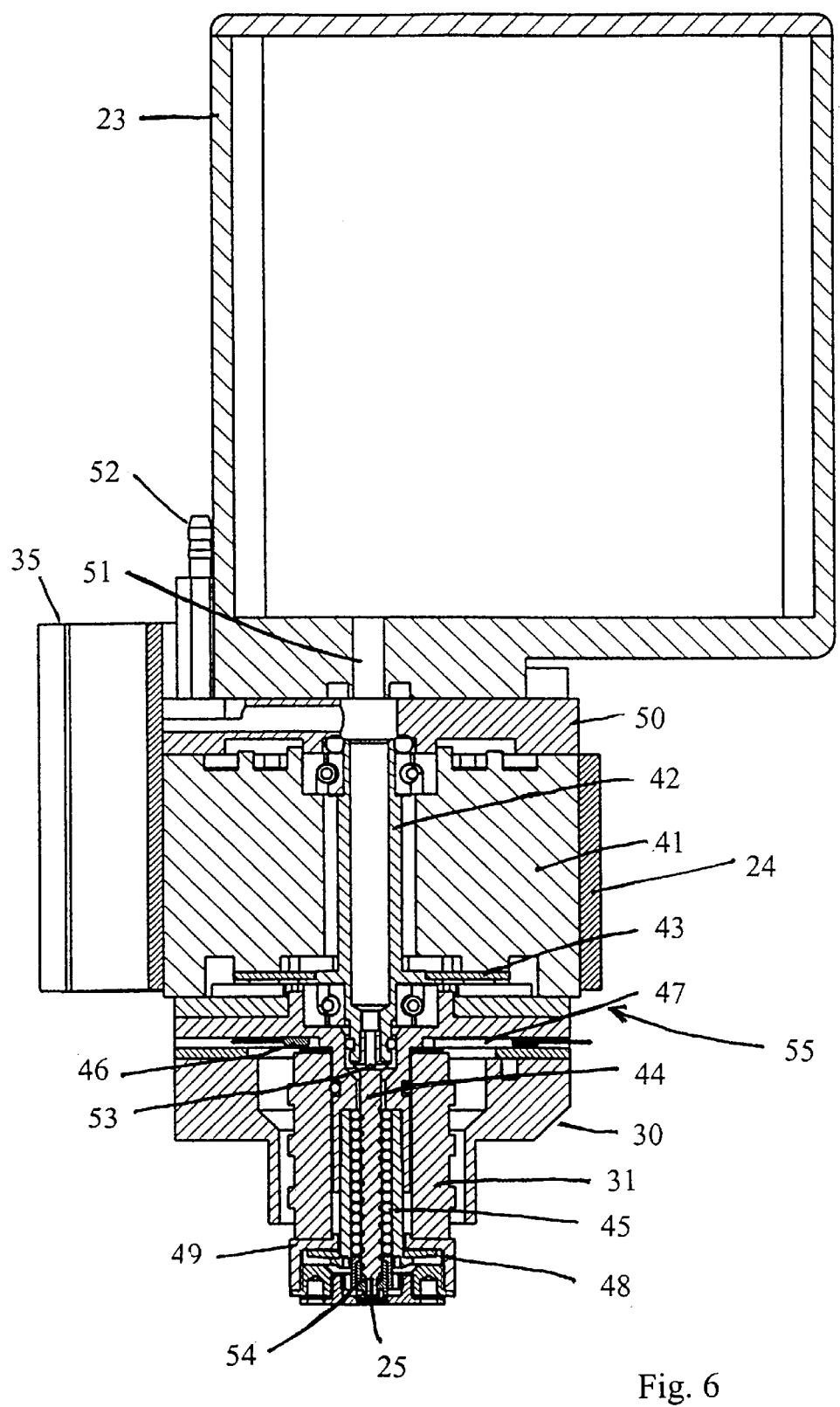
FIG. 6 is a schematic sectional view of the assembly shown in FIG. 2.

Further, the assembly 5 comprises a viscous medium container, or solder paste container, 23, a nozzle 25, and an eject mechanism 55, see FIG. 6, connected to the container 23 and the nozzle 25. The eject mechanism 55 is arranged for feeding solder paste from the container 23 out through the nozzle 25 in a way which is defined as jetting or non-contact dispensing. It is to be noted that consequently, in this embodiment, the assembly 5 is arranged for a special type of dispensing, while various types are within the scope of this invention.

The eject mechanism 55 will now be further described. It is similar to the one disclosed in the above-mentioned Swedish patent application 9802079-5. The eject mechanism 55 from the outside is hidden by assembly holder 24 and by a cooling flange 30. In the cross sectional view in FIG. 6 a proposed outline of the eject mechanism 55 is shown. The solder paste is forced by means of pressurised air out of a hole 51 in the bottom of the solder paste container 23. The pressurised air is supplied through a nipple 52, a hose and suitable connection means (not shown) in the container 23. Preferably, the solder paste is held in a solder paste bag (not explicitly shown) placed in the container 23. An outlet of the bag is connected to the feed hole 51. The pressurised air squeezes the bag. Further, the solder paste is forced through a hole in a motor support 50 and in a motor axis 42 of a stepper motor 41. A feed screw 44 is mounted on the motor axis 42. The feed screw 44 has an axial bore 53 through which the solder paste flows. The solder paste is further transported by the feed screw 44 rotated by the motor 41. The feed screw 44 rotates in a stack of O-rings 45. These O-rings 45 prohibit undesired smearing of the solder balls in the paste. The feed screw 44 transports the paste into an active chamber formed by the end of the feed screw 44, the nozzle 25 and a bushing 54. To eject droplets an actuator 31 is rapidly discharged thus moving the nozzle 25 towards the feed screw 44 and diminishing the volume of said active chamber. The actuator 31 is pre-loaded with a cup spring 48 and an actuator support 49. To have stable temperature during dispensing a thermometer 46 and a heater 47 are provided.

The assembly 5 uses pressurised air for several tasks, e.g. providing a slight overpressure for forcing the solder paste into the eject mechanism 55, cooling of the actuator 31, and cooling of the stepper motor 41. Pressurised air is supplied via pneumatic interface means comprising inlets 26, positioned to interface with complementary pneumatic interface means comprising nipples 20, of the docking device 10. Cooling of the actuator 31 is realised with the aid of the cooling flange 30 providing a slit between its walls and the actuator 31 where cooling air can flow freely.

Signal connections are provided as interface means at the assembly 5 and connectable to complementary signal interface means of the docking device 10 and to complementary signal interface means of the exchange assembly support. An assembly property means is connected to the signal interface means. Preferably the assembly property means comprises general readable storage circuitry, which can hold information about different assembly properties. These properties may be for example an assembly identity, volume conversion factors, the type of medium that is filled in the container 23, the date when the container 23 was last filled, and the operation temperature. By providing these properties to the machine there is no need for an operator to interfere when an assembly is to be exchanged. Further, the assembly property means preferably comprises general writable storage circuitry for receiving and holding information about other assembly properties, which are detectable by means of the machine. For example such properties may be the above-mentioned mechanical offset of the nozzle 25, corrections of the volume conversion factors and the date at which the assembly was last used.

There are a number of ways to execute the transfer of information and the transfer may take place both at the exchange assembly support 7 and at the docking device 10 or merely at either one of the docking device 10 and the support 7. The first mentioned case is preferred. In an embodiment of the invention, when an exchange assembly is arranged at the support 7, the assembly properties are read by the machine via the complementary signal interface means of the support 7, and stored in the database for future use. When an exchange is to take place, the machine obtains property data associated with the respective exchange assemblies 9, which are available at the support 7 and selects the desired exchange assembly 9. After having docketed the new assembly the machine may again read some of its properties in order to secure that it is actually the correct assembly. Alternatively, instead of comprising passive circuitry, the assembly 7, 9 can be provided with suitable circuitry for actively transmitting property data to the machine. This, however, is a more expensive and less desired alternative.

The signal interface means, in excess of communicating assembly properties, inter alia, in the present embodiment, are for supplying the stepper motor 41, the actuator 31 via leads 28, and for measuring temperature via leads 29 and the thermometer 46, which constitutes a Pt-100 sensor or the like, etc. Said signal interface means is implemented as a male contact 27 and interfaces the corresponding signal interface means implemented as a female contact 19 at the docking device 10 and at the exchange assembly support 7. The male contact 27 is in this embodiment a reinforced part of a flexible circuit board. Not previously mentioned signals, which can be provided via this interface, are heater current and driving signals for the stepper motor 41. Extensions of this list are obvious for those skilled in the art. In excess to the above mentioned female contact 19, signal connections at the docking device 10 comprise a flexible circuit board 18, connected to control electronics (not shown) located on the X-wagon 4.

The nipples 20 of the complementary pneumatic interface means of the docking device 10 are connected, via internal channels of the docking device 10, to a set of valves 13 and to input nipples 22. The airflow is controlled by said set of valves 13 arranged at the upper end of the docking device 10. In a conventional fashion, external hoses (not shown) are connected to the input nipples 22. The above described piston 17 is pneumatically actuated with pressurised air supplied through a nipple 21 and one of the valves 13.

Figure 5:
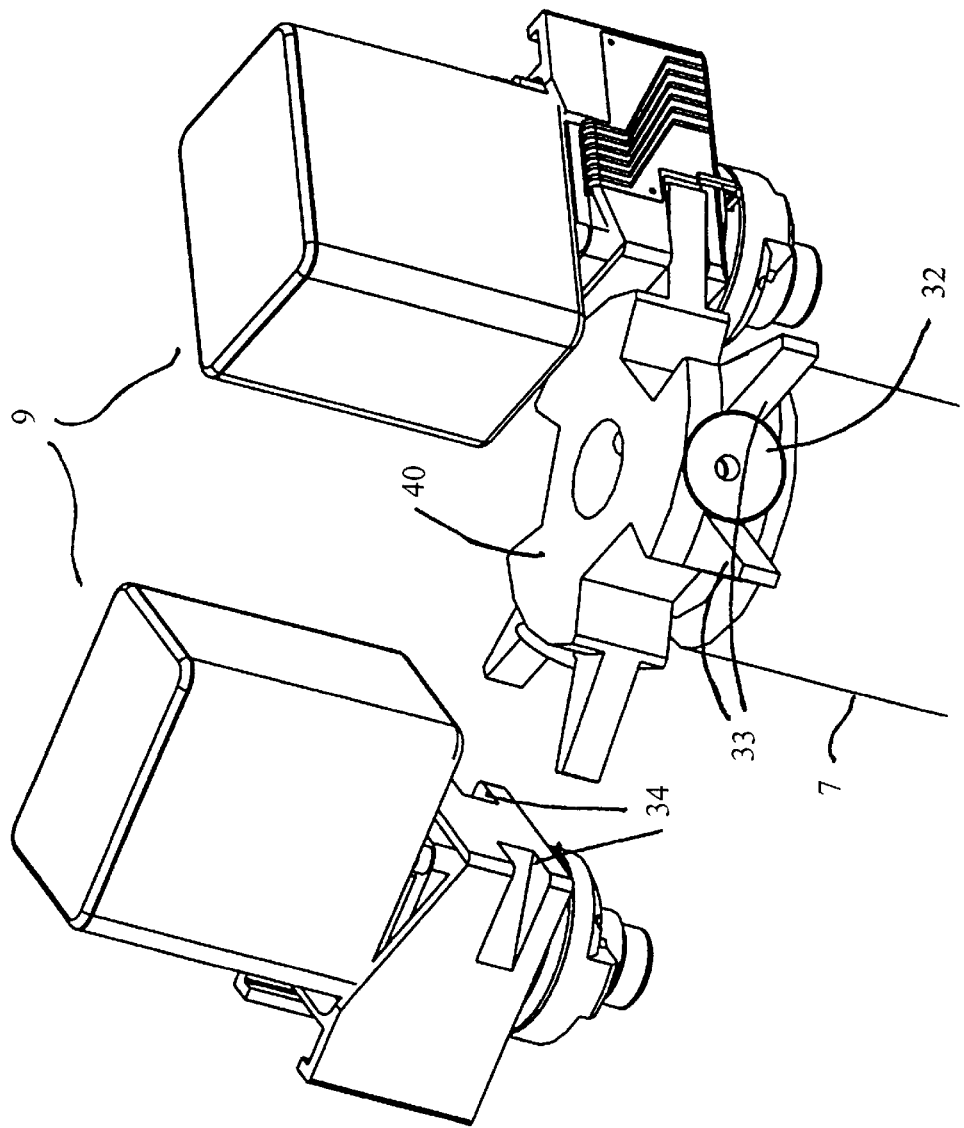
FIG. 5 is a perspective view from above of the assembly of FIG. 2 and of an embodiment of the exchange assembly support of the present invention.

As shown in FIG. 5, the above mentioned exchange assembly support 7 has an exchange wheel 40 comprising at least two, and in this embodiment three, assembly seats. Each of said assembly seats comprises pneumatically controllable means for retaining the assembly. Each seat is defined by a suction cup 32 to hold the assembly 9 firmly and a slotted jaw 33 which mates with cuts 34 in the assembly.

The exchange wheel 40 is rotatable. Preferably, each seat comprises complementary signal interface means enabling the establishment of the exchange assembly properties of the exchange assembly in each seat.

Above preferred embodiments of the machine, assembly and docking device according to the present invention have been described. These should be seen as merely non-limiting examples. Many modified embodiments will be possible within the scope of the invention as defined by the claims. Below a few examples of such modifications will be given.

There are many alternative structures of the signal interface means. In alternative embodiments, at least parts of said means are implemented with optical fibres or microwave guides. Another alternative is to transmit information by means of radio frequency units, such as transmitter and receiver circuitry comprising blue tooth functionality.

There are many possible embodiments of the assembly holder of the assembly and the corresponding assembly support of the docking device. For example, the slot can be formed at the docking device and a mating guide at the assembly. Or, mating pins and holes can be formed, etc.

The solder paste container 23 may hold the paste in different ways. An alternative to the bag described above is to directly fill the container with the paste and pressurise the top surface thereof. In addition, the paste could be covered by a guided transversely movable plate, wherein the pressurised air is let in above the plate.

At the calibration station the calibration surface in an alternative embodiment is constructed as a tape cassette. Thereby, there is no need for cleaning the surface after each calibration. Instead, the tape is simply driven forward for a short moment.

In the method, the step of determining if calibration is required may be deleted, so that the calibration is always done. Alternatively, the calibration is never done, this approach, however, resulting in a decreased accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An assembly for dispensing droplets of a viscous medium, said assembly being releasably mountable in a machine using the assembly for providing a substrate with deposits, and comprising an assembly holder having first holding means for mating with an assembly support of a docking device of the machine, a nozzle, an eject mechanism connected to the nozzle, a viscous medium container connected to the eject mechanism, an assembly property means holding information about properties of the assembly, and signal interface means.

2. An assembly according to claim 1, further comprising pneumatic interface means.

3. An assembly according to claim 1, wherein the assembly holder comprises second holding means for mating an exchange assembly support of the machine.

4. An assembly according to claim 1, wherein the container is pressurisable.

5. An assembly according to claim 1, said signal interface means comprising terminals for power supply of elements for operation and control, terminals for transmitting assembly property information and terminals for transmitting measurement signals.

6. An assembly according to claim 1, said assembly property means comprising a storage means, which is readable from the machine.

7. An assembly according to claim 1, wherein said information comprises at least one of assembly identity, volume conversion factors, type of loaded viscous medium, filling date, and operation temperature.

8. An assembly according to claim 1, wherein said assembly property means comprises a storage means which is writeable from the machine.

9. An assembly according to claim 8, wherein said storage means is arranged to receive at least one of mechanical offset for the nozzle, corrections to volume conversion factors and the date of use of the assembly.

10. A docking device mountable in a machine for providing a substrate with deposits by dispensing droplets of a viscous medium onto the substrate, said docking device comprising an assembly support for receiving an assembly to be used in the machine for said dispensing, said assembly comprising an assembly holder having first holding means for mating with the assembly support, and signal interface means, said docking device having complementary signal interface means.

11. A docking device according to claim 10, further comprising pneumatic interface means.

12. A docking device according to claim 10, said assembly support comprising pneumatically operable assembly locking means.

13. A docking device according to claim 10, wherein said docking device comprises a stand, said assembly support being arranged at the stand and being reciprocatingly movable along the length of the stand.

14. A docking device according to claim 10, the assembly support comprising alignment means.

15. A machine for providing a substrate with deposits by dispensing droplets of a viscous medium onto the substrate, comprising a docking device, said docking device comprising an assembly support for receiving an assembly to be used in the machine for said dispensing, said assembly comprising an assembly holder having first holding means mating with the assembly support, a nozzle, an eject mechanism connected to the nozzle, a viscous medium container connected to the eject mechanism, an assembly property means holding information about properties of the assembly, and signal interface means, said docking device having complementary signal interface means.

16. A machine according to claim 15, comprising an exchange assembly support for supporting at least one exchange assembly.

17. A machine according to claim 16, said exchange assembly support comprising complementary signal interface means.

18. A machine according to claim 15, further comprising means for automatic exchange of an assembly at the docking device for an exchange assembly at the exchange assembly support.

19. A machine according to claim 15, further comprising a calibration surface.

20. A machine according to claim 15, further comprising machine vision means.

21. An assembly for dispensing droplets of a viscous medium, said assembly being releasably mountable in a machine using the assembly for providing a substrate with deposits, and comprising an assembly holder having first holder portions matable with an assembly support of a docking device of the machine, a nozzle, an eject mechanism connected to the nozzle, a viscous medium container connected to the eject mechanism, an assembly property element holding information about properties of the assembly, and a signal interface.

22. An assembly according to claim 21, further comprising a pneumatic interface.

23. An assembly according to claim 21, wherein the assembly holder comprises second holding portions for mating an exchange assembly support of the machine.

24. An assembly according to claim 21, said signal interface comprising terminals for power supply of elements for operation and control, terminals for transmitting assembly property information and terminals for transmitting measurement signals.

25. An assembly according to claim 21, said assembly property element comprising a storage, which is readable from the machine.

26. An assembly according to claim 21, wherein said assembly property element comprises a storage, which is writeable from the machine.

27. A docking device mountable in a machine for providing a substrate with deposits by dispensing droplets of a viscous medium onto the substrate, said docking device comprising an assembly support for receiving an assembly to be used in the machine for said dispensing, said assembly comprising an assembly holder having first holding portions matable with the assembly support, a signal interface, and a pneumatic interface, said docking device having a complementary signal interface, and a complementary pneumatic interface.

28. A docking device according to claim 27, said assembly support comprising a pneumatically operable assembly locking mechanism.

29. A docking device according to claim 27, said assembly support comprising an alignment mechanism.

30. A machine for providing a substrate with deposits by dispensing droplets of a viscous medium onto the substrate, comprising a docking device, said docking device comprising an assembly support for receiving an assembly to be used in the machine for said dispensing, said assembly comprising an assembly holder having first holding portions mating with the assembly support, a nozzle, an eject mechanism connected to the nozzle, a viscous medium container connected to the eject mechanism, an assembly property element holding information about properties of the assembly, and a signal interface, said docking device having a complementary signal interface.

31. A machine according to claim 30, comprising an exchange assembly support for supporting at least one exchange assembly.

32. A machine according to claim 31, said exchange assembly support comprising a complementary signal interface.

33. A machine according to claim 30, being arranged for automatic exchange of an assembly at the docking device for an exchange assembly at the exchange assembly support.

34. A machine according to claim 30, further comprising a machine vision device.

35. A method of exchanging an assembly adapted to dispense droplets of a viscous medium in a machine adapted to provide a substrate with deposits by means of said assembly, comprising the steps of:

providing an exchange assembly adapted to dispense droplets of a viscous medium;

releasing said assembly from a docking device of said machine;

releasably mounting said exchange assembly at said docking device;

transferring property information from said exchange assembly to the machine; and positioning said docking device carrying said exchange assembly and a substrate arranged in the machine in relation to each other.

36. The method according to claim 35, wherein the step of positioning comprises the step of moving a wagon comprised in said machine, on which wagon said docking device is mounted, in relation to said substrate.

37. The method according to claim 35, wherein the step of providing an exchange assembly comprises the step of selecting the exchange assembly, which is performed automatically and comprises the steps of:

determining required exchange assembly properties;

checking an exchange assembly support, carrying a plurality of exchange assemblies, for an exchange assembly having said required exchange assembly properties;

appointing an exchange assembly having the required exchange assembly properties for the exchange.

38. A method according to claim 35, further comprising a step of calibrating, said step of calibrating comprises the steps of:

moving the exchange assembly to a calibration surface;

depositing a plurality of deposits on the calibration surface;

determining the position of said plurality of deposits by viewing it with a vision device comprised in the machine;

determining an offset of the position from an expected position; and storing said offset in a database or in said assembly property means.

39. A method according to claim 35, wherein said property information comprises an assembly identity and wherein the machine has access to an assembly database, the method further comprising the steps of:

obtaining individual information regarding the exchange assembly from the database; and adjusting, on basis of the individual information, machine settings to fit the received exchange assembly.

40. A method according to claim 35, wherein a plurality of exchange assemblies are carried by an exchange assembly support, and wherein the method is performed automatically and further comprises a step of transferring exchange assembly property information from the exchange assemblies to the machine by means of the exchange assembly support.

* * * * *